United States Patent

[11] 3,585,632

[72] Inventor Frederick F. Beck
Glendora, Calif.
[21] Appl. No. 687,809
[22] Filed Dec. 4, 1967
[45] Patented June 15, 1971
[73] Assignee The United States of America as represented by the Secretary of the Navy

[54] CONTROL APPARATUS
2 Claims, 4 Drawing Figs.

[52] U.S. Cl. .......... 340/347AD, 324/68
[51] Int. Cl. .......... H03k 13/02
[50] Field of Search .......... 340/347; 324/68, 79

[56] References Cited
UNITED STATES PATENTS

| | | | |
|---|---|---|---|
| 2,851,596 | 9/1958 | Hilton .......... | 250/27 |
| 2,928,045 | 3/1960 | Renick et al. .......... | 324/68 |
| 3,364,469 | 1/1968 | Long .......... | 324/68 |
| 3,422,422 | 1/1969 | Frank et al. .......... | 340/347 |

*Primary Examiner*—Maynard R. Wilbur
*Assistant Examiner*—Gary R. Edwards
*Attorneys*—Ronald F. Reiling, Charles L. Rubow, Richard S. Sciascia, John W. Pease and Harvey A. David

ABSTRACT: A frequency-to-digital converter is disclosed wherein the frequency of an external signal is digitized by coupling the signal to a priority or program interrupt or signalling channel of a digital computer and connecting internal or external clock pulses to a memory increment or program interrupt channel. The computer is programmed to calculate the number of clock pulses between successive rises of the input signal. Thus, the number of clock pulses is a measure of the period of the input signal which is the reciprocal of the instantaneous frequency.

INVENTOR.
FREDERICK F. BECK
BY Bruce C. Lutz
ATTORNEY

Frederick F. Beck
INVENTOR
By Harvey A. David
John M. Pease
Attorneys

CONTROL APPARATUS

SUMMARY OF THE INVENTION

Frequency-to-digital converters are well known in the art and are relatively simple devices. Generally, in prior art frequency-to-digital converters, the frequency of a signal is determined by counting the number of periods which occur in a predetermined time interval. The count is proportional to the frequency of the signal. While this concept of frequency-to-digital conversion is very simple, a counter, wave-shaping circuitry, and timing circuitry are required. Furthermore, the resulting digital signal is usually used for calculations in a digital computer so that an interface must be made between he counter and the computer to enable the computer to read the contents of the counter. This interface must also contain synchronizing circuitry so that the counter is read only after a conversion has been completed.

This invention provides a substantial improvement over the prior art frequency-to-digital converter since a minimum of circuitry external to the computer is used and the computer does most of the actual work. In accordance with this invention, the input signal, the frequency of which is to be digitized, is connected to an interface circuit which is in turn connected to a priority or program interrupt or signalling channel of a digital computer. The interface circuit comprises a simple circuit for squaring the input signal and for converting it to pulses of sufficient amplitude and duration to drive the interrupt or signalling circuitry of the computer. When the interrupt or signalling channel s enable, a signal applied to the interrupt or signalling circuitry interrupts or signals the computer program. In this description, a computer interrupt feature is used and the computer interrupt feature is energized when the leading edge of a pulse from the interface circuit occurs. The interrupt circuitry is energized a second time when the next leading edge of a signal from the interface circuitry occurs. The time between two successive leading edges of the output signal from the interface circuitry is equal to the period of the input signal so that the time between two successive interrupts is also equal to the period of the input signal. As the period of a signal is the reciprocal of the frequency, the frequency can easily be calculated once the period is known.

To obtain a digital number indicative of the period of the input signal, the digital computer counts clock pulses between two successive interrupts. The clock pulses which are counted can be generated internally in the computer such as by an internal clock which increments a specific register. Other computers have a memory increment interrupt feature wherein a predetermined memory location or register is incremented by one each time the memory increment interrupt channel receives an interrupt signal. A clock can be connected to the memory increment interrupt channel so that the predetermined register is actually operated as a counter. The predetermined register can either be set to zero at the time the first priority interrupt occurs or may merely be read. The register is read a second time when the second priority interrupt signal occurs, and the number of clock pulses which occur between the two interrupts is a measure of the period of the input signal. The frequency can be calculated from the period by taking the reciprocal of the period.

Accordingly, it is an object of this invention to provide a new and unique frequency-to-digital converter.

It is a further object of this invention to provide a frequency-to-digital converter for use in a computing system which has a minimum of circuitry external to the computer.

These objects and other objects and advantages of this invention will become evident to those skilled in the art upon a reading of this specification and the appended claims in conjunction with the drawings, of which:

DETAILED DESCRIPTION OF THE INVENTION

Figures 1, 2, 3:
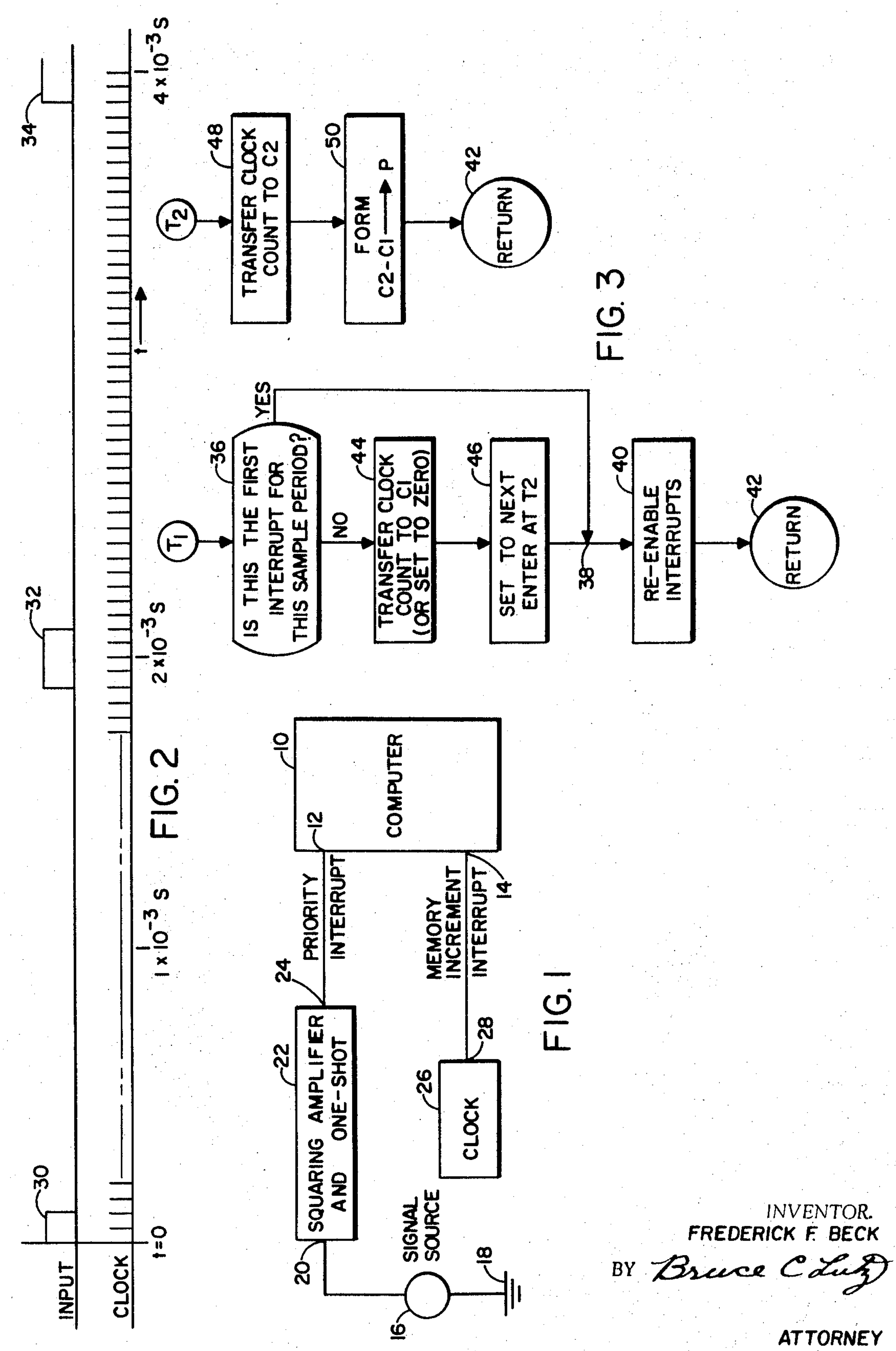
FIG. 1 is a block diagram of one embodiment of this invention.
FIG. 2 is a timing diagram to aid in explaining FIG. 1.
FIG. 3 is a flow chart to aid in explaining the operation of the computer of FIG. 1
Figure 4:
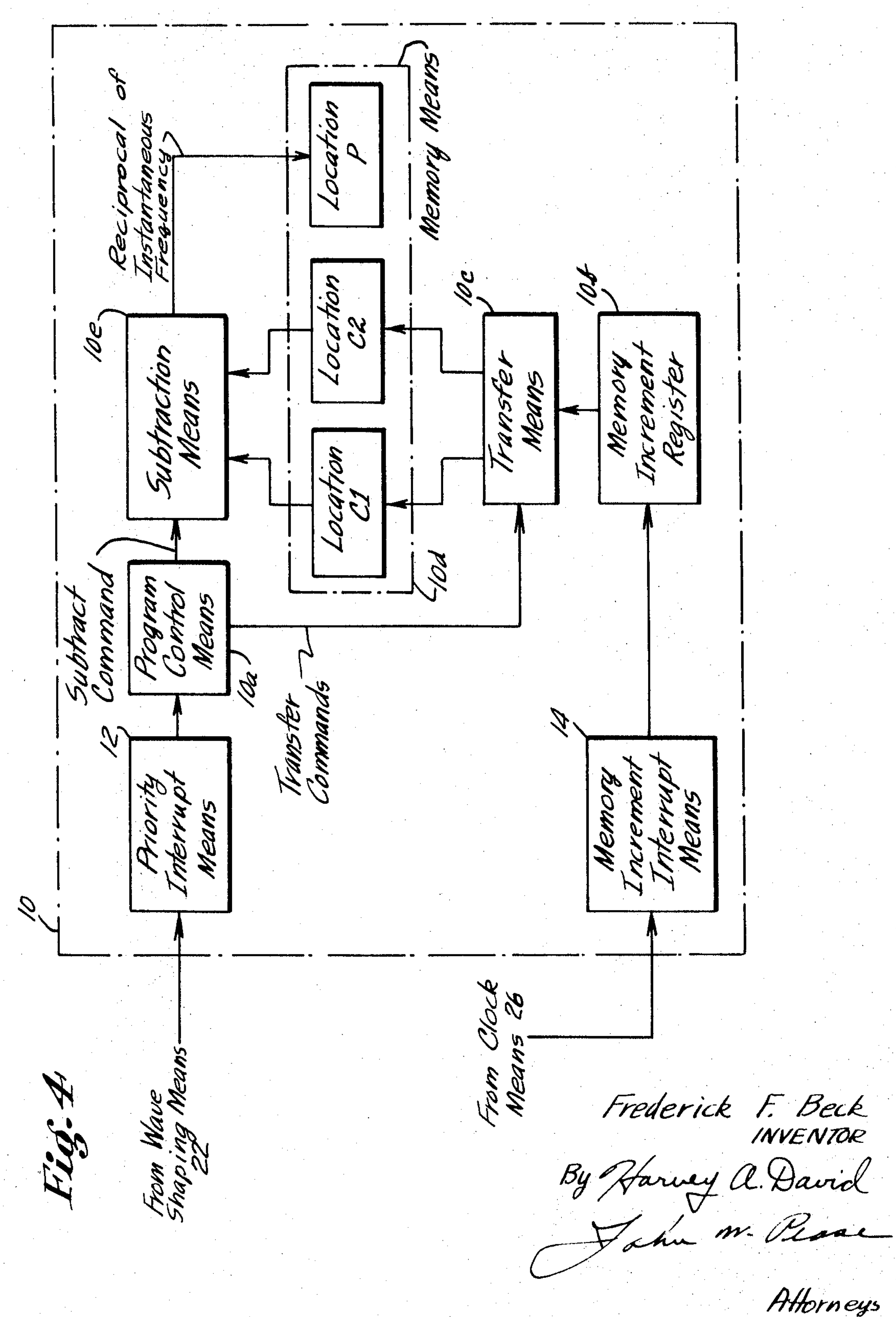
FIG. 4 is a diagrammatic illustration in block form of the computer portion of FIG. 1.

In FIG. 1 and in FIG. 4 there is shown a computing means or computer 10 which has a priority or program interrupt or signalling circuit, channel, or means 12 and a memory increment interrupt channel, circuit or means 14. A signal source or input means 16 is connected between a common conductor or ground 18 and an input means 20 of a wave-shaping means or squaring amplifier and one-shot circuit 22. An output 24 of squaring amplifier and one-shot 22 is connected to the priority interrupt channel 12 of computer 10. A clock means 26 has an output means 28 connected to memory increment interrupt channel 14 of computer 10. A computer which contains both the priority interrupt feature and the memory increment interrupt feature is the Honeywell DDP 416 computer. A text which explains the interrupt features of a digital computer is the Digital Small Computer Handbook, 1967 edition, Digital Equipment Corporation, pp. 37—71, 108—109, 269—270, 435—437, and 444—446. The referenced pages explain the operation of the interrupt features of a digital computer and give some examples of how the interrupt features can be used.

As was indicated above, a signalling channel or circuit can be used instead of an interrupt channel. All that is necessary is that the computer must have some capability of communicating with external circuitry to determine when a pulse from squaring amplifier and one-shot circuit 22 occurs. The first pulse must cause the computer to start timing and the next successive pulse must cause the computer to end the timing period. Also, it is not necessary for the practice of this invention to use a memory increment interrupt channel. It is only necessary that the computer have some means or method for timing between successive signals from squaring amplifier and one-shot circuit 22. A clock connected to a memory increment interrupt channel is one such means. Another might be an internal clock which drives an internal counter.

To understand the operation of FIG. 1 assume that the signal provided by signal source 16 is a sinusoidal signal. This signal is applied to squaring amplifier and one-shot 22. The squaring amplifier squares the sine wave or converts the sine wave to a square wave and the one-shot converts the square wave to a signal of sufficient amplitude and the proper duration to drive the priority interrupt circuitry 12 of computer 10. The output pulses appearing at output 24 are represented by pulses 30, 32, and 34 of the graph labeled INPUT in FIG. 2. Obviously, if the signal provided by signal source 16 is a square wave, the squaring amplifier is not necessary. If the signal is also of an amplitude and duration which will properly operate the priority interrupt circuitry 12, the one-shot circuit is not necessary.

Clock 26 provides a pulse train which s illustrated by the pulses in the graph labeled CLOCK in FIG. 2. For purposes of this specification it is assumed that clock 26 provides output pulses at the rate of 20,000 Hz., that the frequency to be converted is 500 Hz. and that the input signal is to be sampled at a rate of 10 samples per second. In the practice of this invention, the sampling rate is dictated by the expected rate of change of the frequency of the input signal. The clock rate is controlled by the finest frequency discrimination desired. For example, if a discrimination between periods of 140 microseconds is desired, the period of the clock pulses must be less than 70 microseconds or one-half of the finest discrimination desired. A clock period of 70 microseconds is equivalent to a frequency of 14,266 Hz. Since a 20,000 Hz. clock frequency is being used, the finest discrimination is 100 microseconds. It is to be understood that the above frequencies and periods are given for each of explanation only and are not to be considered as limiting the scope of the invention. Further, it is understood that any signalling means (including interrupts) and any computer timing means including internal or external clocks) can be utilized and are included in the scope of this invention.

FIG. 4 illustrates those elements of a computer 10 which are referred to as the description proceeds and examples of operation re given. Briefly, in addition to the priority interrupt means 12 and the memory increment interrupt means 14, the the elements concerned are a program control means 10*a*, a memory increment register 10*b*, transfer means 10*c*, memory means 10*d* having locations C1, C2 and P, and subtraction means 10*e*.

To understand the operation of this invention, assume that computer 10 is programmed in accordance with the flow chart of FIG. 3. Further assume that computer 10 is programmed to normally perform some function other than the frequency-to-digital conversion. The priority interrupt channel 12 is ordinarily disabled so that signals appearing at output 24 of squaring amplifier and one-shot 22 do not interrupt the program. Since the sampling rate is 10 samples per second, each one-tenth of a second priority interrupt channel 12 is enabled. Priority interrupt channel 12 can also have a memory so that if an interrupt signal has occurred since the last time the channel was enabled, the priority interrupt will provide an immediate program interrupt to the program control means 10*a* of the computer. Since the time at which the interrupt channel memory was set cannot be determined, the first program interrupt must be ignored by the computer. If the interrupt channel does not have this memory feature the interrupt channel may be enabled during an interrupt signal from squaring amplifier and one-shot 22 so that it is still necessary to ignore the first interrupt. Referring to FIG. 2 assume that a sample period starts at $t$=0. At $t$=0 interrupt channel 12 is enabled. Note that pulse 30 is partially completed when interrupt channel 12 is enabled. As the computer cannot determine when pulse 30 began, it is necessary to ignore pulse 30.

When the priority or program interrupt channel 12 is enabled, the program or normal routine of the computer continues to execute until an interrupt signal is received. The interrupt signal causes the program to interrupt its normal routine and to proceed to point T1 on the flow chart of FIG. 3. The flow chart of FIG. 3 illustrates a subroutine that the computer executes when the program is interrupted. The computer proceeds through the subroutine from the entrance point T1 to the first block 36 where the question is asked, "Is this the first interrupt for this sample period?" If the answer is yes, the program jumps to point 38 from which it proceeds to block 40 to reenable the interrupts. In this connection it should be noted that each time a signal is received at priority interrupt 12, the interrupt is automatically disabled. Thus, the program proceeds from junction point 38 to block 40 where the interrupt is reenabled. After the interrupt is reenabled, the subroutine program proceeds to point 42 where the computer returns to the main program. The feature of disabling the interrupt channel each time an interrupt signal is received and returning to the main program or regular routine of the computer conserves computer time. This, the computer is not standing idle while a frequency determination is being made.

Assume that the interrupt routine described above was made in response to interrupt signal 30. Since there are no interrupt signals occurring between pulse 30 and pulse 32, the computer will execute its normal routine until the leading edge of pulse 32 occurs when the normal routine will be interrupted again and the computer will proceed to point T1 of FIG. 3. Since this interrupt is not the first interrupt for the sample period, the subroutine program will proceed from block 36 to block 44 labeled "transfer clock count to C1 (or set to 0)." During the execution of this block, the program will read the contents of the memory increment register 10*b* which is continuously being incremented by the clock pulses from clock 26. The contents of this register 10*b* will be transferred by means 10*c* to some memory means 10*d* location labeled C1 or else the memory increment register will be set to zero depending upon how the particular computer operates. Next, the subroutine program proceeds to block 46 labeled "set to next enter at T2." During the execution of this block, the program is modified so that when the next interrupt occurs the computer will enter the subroutine at point T2 rather than T1. The subroutine then causes the interrupt channel 12 to be reenabled and the computer returns to execution of the main program or normal routine. Since the computer can process several instructions very rapidly, the time required to process block 36 and 44 will be very short compared to the period of the pulses provided by clock 26. Thus, the processing delay will not cause a significant error in the frequency determination.

Between the leading edges of pulse 32 and pulse 34 the memory increment register 10*b* is being continually incremented by clock pulses. When interrupt signal or pulse 34 occurs, the program is again interrupted. The computer proceeds to pot T2 and from there to block 48 labeled transfer clock count to C2 of memory means 10*d*. If execution of block 44 sets the memory increment register to zero, the count contained in memory location C2 is equal to the number of clock pulses between the leading edges of pulses 32 and 34. However, if instead the contents of the memory increment register were transferred to memory location C1 when block 44 was executed, it is now necessary to form the difference between the clock count at the leading edge of pulse 32 and the clock count at the leading edge of pulse 34. This difference is formed by subtraction means 10*c* in the execution of block 50 and the result or answer is transferred to memory location P of memory means 10*d*. After block 50 has been executed, the subroutine proceeds to point 42 where the computer returns to the main program.

Since the priority interrupt channel 12 is automatically disabled by pulse 34, consequent interrupt signals will not interrupt the program until it is time to take another sample, i.e., the next sample period. In the example shown in FIG. 2, ere are 40 clock pulses which occur between the leading edges of pulses 32 and 34. Since the clock frequency is 20,000 Hz., 40 pulses received implies an input signal period of $2\times10^{13}$ seconds which is equivalent to 500 Hz.

Various modifications of this invention for specific purposes can obviously be made. For example, assume that the input signal can only have five possible frequencies. Since only five frequencies are possible, the tolerances of discrimination will only have to be accurate enough to distinguish between the various frequencies. Also, the sampling rate would be dictated by the shortest length of time that one of the five frequencies could occur. Additional provisions can be made for checking the frequency determination to see that it corresponds to one of the possible frequencies. It is obvious from the above description that many modifications of my invention can be made. Accordingly, I do not wish to be limited by the specific embodiment shown and described nor by the specific numbers used for examples but only by the scope of the appended claims.

I claim as my invention:

1. Apparatus for determining the frequency of a signal comprising:

input means for receiving an input signal whose frequency is to be determined;

pulse forming means connected to said input means for producing a train of pulses having a repetition rate indicative of the frequency of the input signal;

digital clock means for producing a train of clock pulses;

computer means including register means connected to receive clock pulses from said digital clock means, said register means operable to increment a count contained therein in response to each clock pulse; memory means including first and second memory locations; transfer means for transferring counts from said register means to the first and second memory locations; subtraction means for subtracting the count in the first memory location from the count in the second memory location and providing an indication of the difference; and programmed control means for causing said transfer means to transfer the count from said register to the first memory location in response to a pulse from said pulse forming means, to transfer the count from said register to the second memory location in response to the next succeeding pulse from said pulse forming means, to subsequently cause said subtraction means to subtract the count in the first memory location from the count in the second memory location, and to thereafter empty the first and second memory locations and return the transfer means to a state of readiness for transferring a count to the first memory location.

2. The apparatus of claim 1 wherein said computer means includes priority interrupt means for interrupting performance of a program being run in response to a first pulse from said pulse forming means and supplying only succeeding pulses to said programmed control means.